(12) United States Patent
Wang et al.

(10) Patent No.: US 9,529,341 B2
(45) Date of Patent: Dec. 27, 2016

(54) MOTION-CONTROL SYSTEM FOR PERFORMING DIFFERENT TASKS

(71) Applicant: Mitsubishi Electric Research Laboratories, Inc., Cambridge, MA (US)

(72) Inventors: Yebin Wang, Acton, MA (US); Yu Jiang, Brooklyn, NY (US); Scott A Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 309 days.

(21) Appl. No.: 14/063,019

(22) Filed: Oct. 25, 2013

(65) Prior Publication Data
US 2015/0115860 A1 Apr. 30, 2015

(51) Int. Cl.
G05B 13/02 (2006.01)

(52) U.S. Cl.
CPC ................... *G05B 13/024* (2013.01)

(58) Field of Classification Search
CPC .................................................. G05B 13/024
USPC .......................... 318/516, 571, 572, 569, 611
See application file for complete search history.

(56) References Cited

U.S. PATENT DOCUMENTS

| | | | | |
|---|---|---|---|---|
| 5,459,383 A * | 10/1995 | Sidman et al. | ............... | 318/611 |
| 5,504,407 A * | 4/1996 | Wakui | ................. | G03F 7/70716 318/568.17 |
| 6,343,248 B1 * | 1/2002 | Rizzotto | ............ | B60G 17/0182 280/5.503 |
| 8,560,171 B2 * | 10/2013 | Hozumi | ......................... | 701/37 |
| 2002/0193920 A1 * | 12/2002 | Miller et al. | .................... | 701/29 |
| 2005/0107895 A1 * | 5/2005 | Pistikopoulos et al. | ........ | 700/52 |
| 2005/0190351 A1 * | 9/2005 | Cox et al. | ....................... | 355/53 |
| 2007/0279742 A1 * | 12/2007 | Plug et al. | ..................... | 359/554 |
| 2008/0017245 A1 * | 1/2008 | Kessler et al. | .................... | 137/2 |
| 2010/0057260 A1 * | 3/2010 | Fallahi | .......................... | 700/280 |
| 2011/0029197 A1 * | 2/2011 | Uenuma et al. | ................ | 701/37 |
| 2011/0285340 A1 * | 11/2011 | Takeuchi et al. | ............ | 318/632 |
| 2013/0328253 A1 * | 12/2013 | Kraner et al. | ........... | 267/140.14 |

OTHER PUBLICATIONS

Jianbo Lu & Robert E. Skelton (2000): Integrating structure and control design to achieve mixed H2/H performance, International Journal of Control, 73:16, 1449-1462.

* cited by examiner

Primary Examiner — Shawki S Ismail
Assistant Examiner — Muhammad S Islam
(74) Attorney, Agent, or Firm — Gene Vinokur; James McAleenan; Hironori Tsukamoto

(57) ABSTRACT

A motion-control system for moving a mass according to different tasks includes at least one controllable actuator for performing the different tasks and an input module for receiving a specific task to perform. The system also includes a controller for controlling a performance of the specific task by the controllable actuator according to a specific control law and a tunable actuator having a tunable parameter of mechanical response, wherein the tunable actuator is mechanically arranged in the system, such that different values of the tunable parameter change dynamics of the system. An optimization module of the system jointly selects a value of the tunable parameter and the specific control law based on the specific task.

19 Claims, 16 Drawing Sheets

430

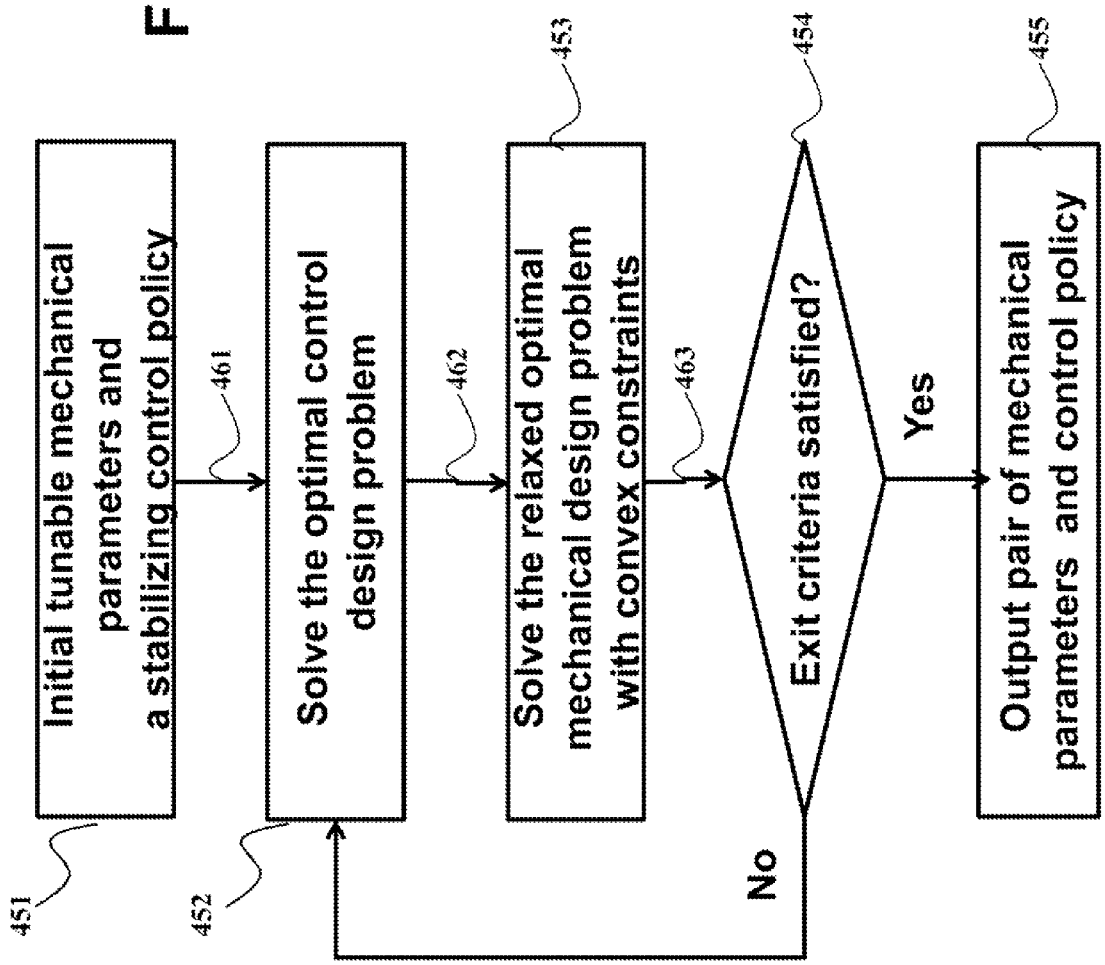

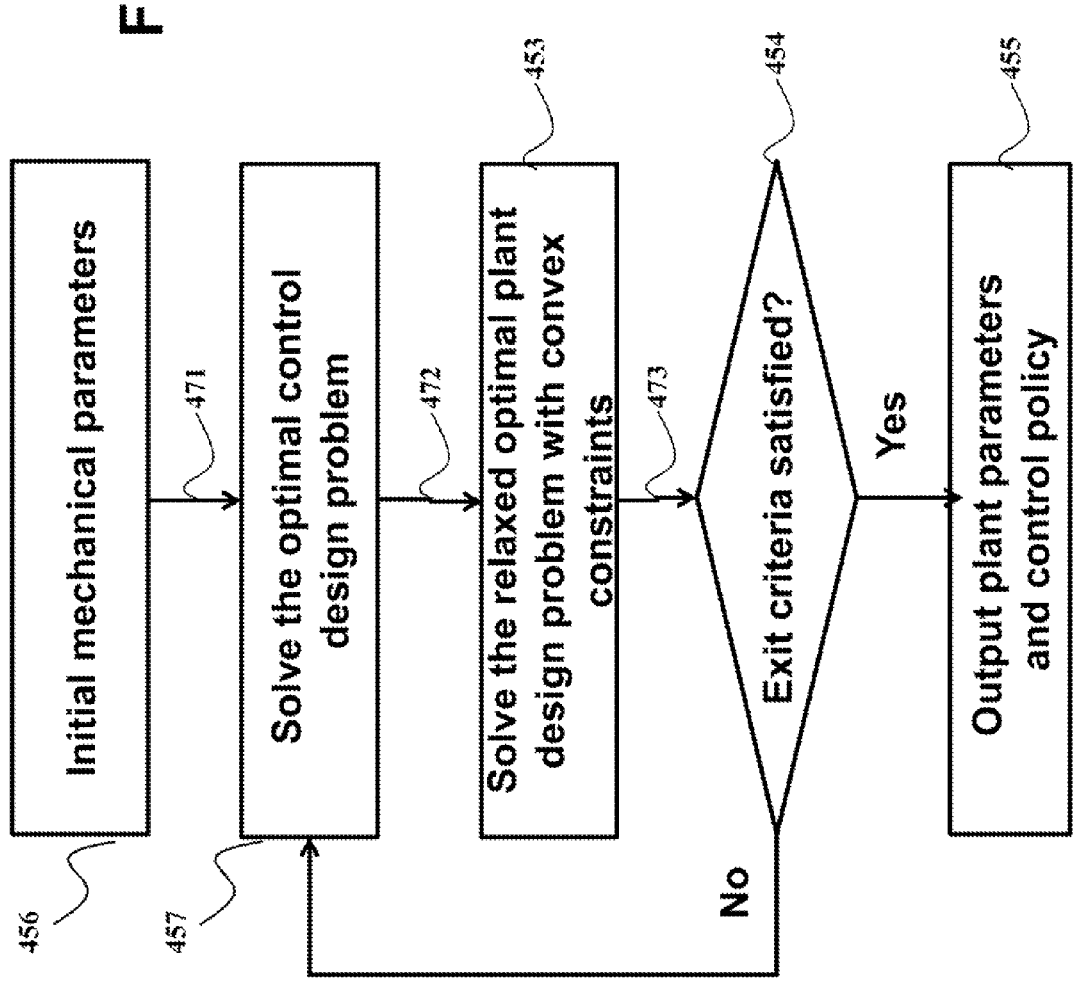

452

MOTION-CONTROL SYSTEM FOR PERFORMING DIFFERENT TASKS

FIELD OF INVENTION

This invention relates generally to a motion-control system, and more specifically to motion-control system for moving a mass according to different tasks.

BACKGROUND OF INVENTION

A typical motion-control system, e.g., an electromechanical control system, includes a mechanical subsystem and a control subsystem. The mechanical subsystem includes electromechanical components that can be represented as masses, springs, dampers, and actuators. The actuators can be electric motors, hydraulic actuators, piezoelectric actuators, etc. The control subsystem includes a control module evaluating control methods, electronics, for instance, amplifiers, sensors, etc. The actuators are controlled by the control modules responding to tasks from user and other inputs and signals from sensors. The actuators controlled by the control modules are herein referred to as controllable actuators.

FIG. 1 shows a schematic of conventional single-axis motion-control system. The subsystem of the system of FIG. 1A includes a base mass 151 and a load mass 152, a base spring 153, a base damper 154 and a load damper 155, and a controllable actuator 156, which usually is an electric motor. The electric motor is connected to the base and the load mass. The rotation or linear movement of the electric motor can exert a force on the load mass and the base mass, thus moving the load mass in a specific direction, e.g., the horizontal x direction. One purpose of the single-axis motion-control system is to move the load mass to a specific position along the x direction. The mechanical subsystem is designed according to some specifications e.g. typical tasks of the system, a size of the system, and cost.

One disadvantage of that motion-control system is a lack of flexibility and unsatisfactory performance. This is due to the fixed and decoupled design of the mechanical subsystem and the control subsystem. During the operation of such a system, it is difficult or even impossible to change at least some of those parameters, i.e., the system has a fixed electromechanical design. Accordingly, conventional methods for optimizing the operation of the motion-control system focus on control methods running in the control module to command controllable actuators.

However, there is a need to optimize the operation of the motion-control system by redesigning the mechanical subsystem and the control subsystem online for different tasks or criteria.

SUMMARY OF INVENTION

There is a need to optimize operation of motion-control machines configured to move a mass according to different tasks. Examples of such machine include a servo-motor machine moving a mass along one or multiple axes, a laser cutting or drilling machine moving a laser tool according to a predetermined path, a manipulator, e.g., an arm of a robot moving in 3D space. Examples of different tasks can be moving a laser tool according to different patterns.

The problem of optimizing the operation of the motion-control machine lies in understanding that different tasks of the machine might be better optimized for different designs of the machine. However, the design of the machine is usually predetermined independently of the specific future tasks the machine will be performing. For example, a laser cutting machine may include a motor moving a platform arranged on the rails, and the laser tool rigidly connected to the platform. Such laser cutting machine can also include various springs and other dumpers to reduce the vibration of the machine. However, all mechanical parameters of all components of such machine are predetermined and fixed.

During the operation of such machine, it is difficult or even impossible to change at least some of those parameters, i.e., the machine has a fixed design. Accordingly, the conventional optimization methods concentrate on improving control of controllable actuators, e.g., motors, moving the mass.

However, some embodiments of the invention are based on a realization that tunable actuators, e.g., semi-active actuators with flexible damping parameters, can be introduced into the structure of the motion-control machines not for the purpose of performing a specific task of the machine, but for the purpose of affecting the dynamics of the machine. Specifically, the introduction of the tunable actuators can make dynamics of the machine tunable, i.e., modifiable for different tasks. Thus, for the different tasks, different parameters of the tunable actuators can be selected. For example, the tunable actuator can be added into the existing machine externally, e.g., by connecting the machine to the ground. Additionally or alternatively, the tunable actuator can be added internally, e.g., connecting to various components of the machine.

Notably, the tunable actuators are currently installed into various systems to perform tasked specifically assigned to those tunable actuators. For example, one system, the tunable actuator is installed to compensate the vibration of the elevator car caused by the deformations of the guiding rails. The control law for controlling this tunable actuator is designed to optimize the performance of this task. Similarly, in another system, the semi-active actuator is installed to reduce a sway of the elevator rope, and the damping coefficient of the semi-active actuator is controlled in accordance with that task. However, at the best of our knowledge, we are not aware of the system that includes semi-active actuator not to perform the specific task assigned to that actuator, but just to change the dynamics of the entire system. Moreover, we are not aware of any system having a semi-active actuator that is controlled, not to perform the task assigned to that semi-active actuator, but to optimize the task performed by another actuator. In some embodiments, that tunable actuator can be called a redundant actuator, because that actuator is not necessary to perform the task of the machine.

Accordingly, the introduction of the redundant tunable actuator allows some embodiments to jointly select the adjustable parameter and the specific control law in response to receiving the specific task. As used herein, the joint selection means determine a pair of control law and the corresponding parameters of the tunable actuator resulting in the best performance of the specific task. For example, one embodiment determines different control laws optimizing the performance of the controllable actuator controlling the movement of the mass according to a specific task with different parameters of the tunable actuator. The control law and the corresponding parameters of the tunable actuator resulting in the optimal performance of the specific task are selected.

Some embodiments further provide methods for determining the optimal values of parameters of tunable actuators, and the corresponding control law. For example, some embodiments determine the values of tunable parameters of the tunable actuator by solving an optimal co-design problem, which is formulated as a non-convex optimization problem over an infinite dimensional decision space.

Some embodiments of this invention solve the optimal co-design problem to determine both the optimal values of the tunable parameters and the control policy for implementation of a tunable motion control system, which can be modeled as a continuous-time linear system. The optimal co-design problem is formulated as a nonlinear non-convex optimization problem (NNOP). Some embodiments use iterative approaches to solve the NNOP, which renders a much less conservative design of the tunable motion control system. Particularly, the non-convex optimal co-design problem is decomposed into two sub-problems: an optimal control design problem and an optimal mechanical design problem. The optimal mechanical design problem is subject to non-convex constraints thus difficult to solve. One embodiment of this invention relaxes the optimal mechanical design problem, and replaces non-convex constraints of the relaxed optimal mechanical design problem with a set of convex constraints. The relaxed optimal mechanical design problem with the set of convex constraints can be solved as a standard semi-definite programming problem, without non-convexity and nonlinearity.

One embodiment of this invention determines the tunable actuator parameters, given a specific input by solving the optimal control design problem and the relaxed optimal mechanical design problem with convex constraints iteratively. This embodiment provides method for determining values of tunable actuator parameters, which are much less conservative, and thus, lead to better system performance.

Accordingly, one embodiment of the invention discloses a motion-control system for moving a mass according to different tasks. The system includes at least one controllable actuator for performing the different tasks; an input module for receiving a specific task to perform; a controller for controlling a performance of the specific task by the controllable actuator according to a specific control law; a tunable actuator having a tunable parameter of mechanical response, wherein the tunable actuator is mechanically arranged in the system, such that different values of the tunable parameter change dynamics of the system; and an optimization module for jointly selecting a value of the tunable parameter and the specific control law based on the specific task.

Another embodiment includes a method for controlling a performance of a motion-control system for moving a mass according to different tasks. The method includes selecting from a set of tunable parameters and a set of control laws in response to receiving a specific task of the performance, a value of a tunable parameter and a specific control law; adjusting, before the performance, a mechanical response of a tunable actuator according to the value of the tunable parameter, wherein the tunable actuator is mechanically arranged in the system, such that different values of the tunable parameter change dynamics of the system; controlling, during the performance, a controllable actuator to perform the specific task using the specific control law.

BRIEF DESCRIPTION OF DRAWINGS

FIGS. 4A, 4B, 4C and 4D are block diagrams of embodiments implementing the tunable motion control system by solving an optimal co-design problem according to some embodiments of the invention.

DETAILED DESCRIPTION OF THE INVENTION

Problem Overview

Figure 1:
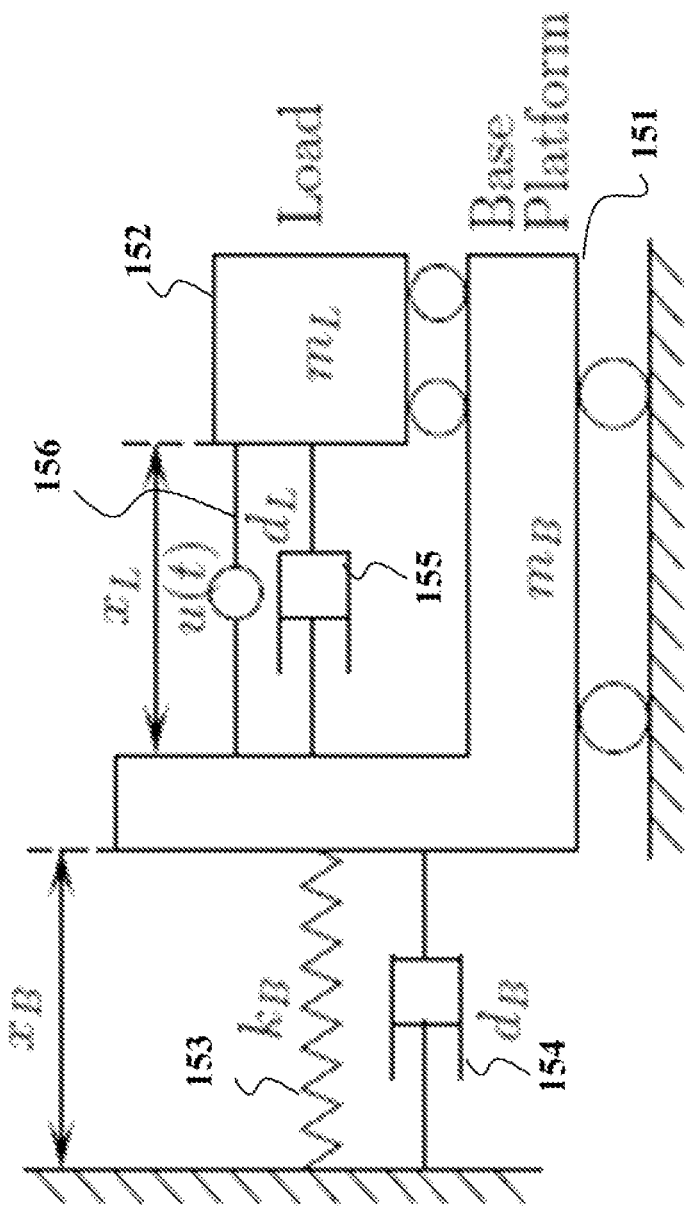
FIG. 1 is a schematic of a conventional motion control system.

Various embodiments of the invention are based on a recognition that there is a need to optimize operation of motion-control systems configured to move a mass according to different tasks. Examples of such system include a servo-motor machine moving a mass along one or multiple axes, a laser cutting or drilling machine moving a laser tool according to a predetermined path, a manipulator, e.g., an arm of a robot moving in three-dimensional (3D) space. Examples of different tasks can be moving a laser tool according to different patterns.

Some embodiments are based on a general realization that different tasks of the system can be optimized for different designs of the system. However, the design of the system is usually predetermined independently of the specific future tasks the system will be performing. For example, a laser cutting system can include a motor moving a platform arranged on the rails, and the laser tool rigidly connected to the platform. Such laser cutting system can also include various springs and other dampers to reduce the vibration of the system. However, all parameters of all components of such system are predetermined and fixed. During the operation of such system, it is difficult or even impossible to change at least some of those parameters, i.e., the system has a fixed design.

Some embodiments of the invention are based on a specific realization that tunable actuators, e.g., semi-active actuators with flexible damping parameters, can be introduced into the structure of the motion-control systems, not for the purpose of performing a specific task of the system, but for the purpose of affecting the dynamics of the system. Specifically, the introduction of the tunable actuators can make the dynamics of the system tunable, i.e., modifiable, for different tasks. Thus, for the different tasks, different parameters of the tunable actuators can be selected. For example, the tunable actuator can be added into the existing system externally, e.g., by connecting the system to the ground. Additionally or alternatively, the tunable actuator can be added internally, e.g., connecting to various components of the system.

The tunable actuators are installed into various systems to perform tasked specifically assigned to those tunable actuators. For example, a tunable actuator can be installed to compensate the vibration of the elevator car caused by the deformations of the guiding rails and the control law for controlling this tunable actuator is designed to optimize the performance of this task. Similarly, the tunable actuator can be installed to reduce a sway of the elevator rope, and the damping coefficient of the tunable actuator is controlled in accordance with that task.

However, various embodiments of the invention include the tunable actuator not to perform the specific task assigned to that actuator, but just to change the dynamics of the system. Specifically, the embodiments control the parameter of the tunable actuator, not to perform the task assigned to that semi-active actuator, but to optimize the task performed by another different actuator. In some embodiments, that tunable actuator can be called a redundant actuator, because that actuator is not necessary to perform the task of the system.

Accordingly, the introduction of the redundant tunable actuator allows some embodiments to jointly select the adjustable parameter and the specific control law in response to receiving the specific task. As used herein, the joint selection means determining a pair of control law and the corresponding parameters of the tunable actuator resulting in the best performance of the specific task. For example, one embodiment determines different control laws optimizing the performance of the controllable actuator controlling the movement of the mass according to a specific task with different parameters of the tunable actuator. The control law and the corresponding parameters of the tunable actuator resulting in the best performance of the specific task are selected.

Tunable Motion Control System

Figure 2A:
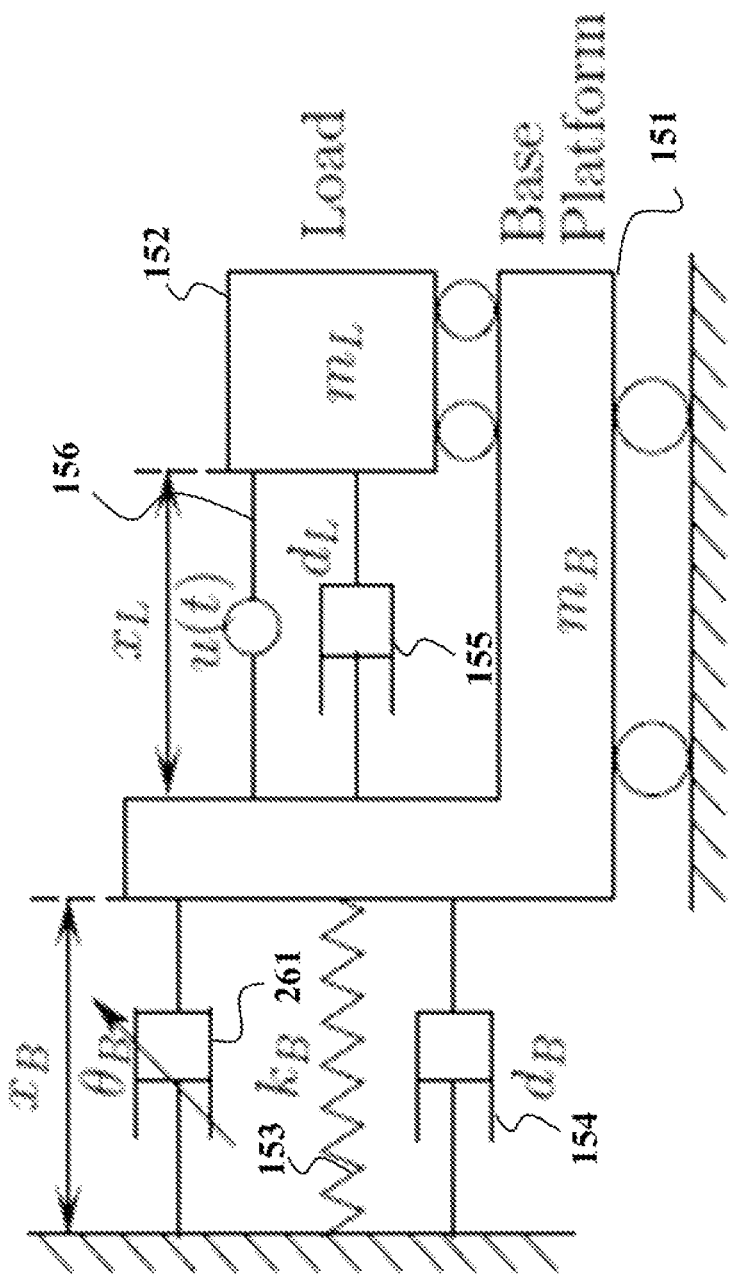
FIGS. 2A, 2B, 2C, 2D, 2E and 2F are schematics of architectures of a tunable motion control system according to some embodiments of the invention.
Figure 2B:
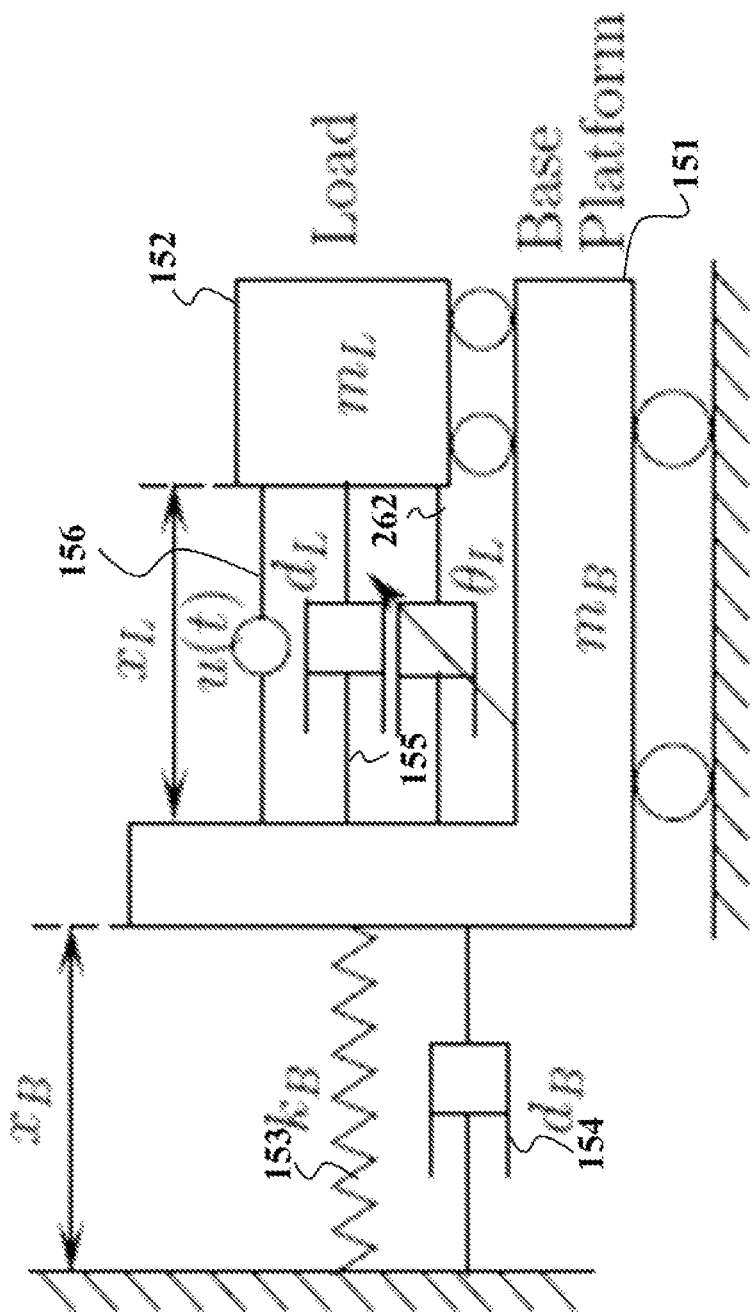
Figure 2C:
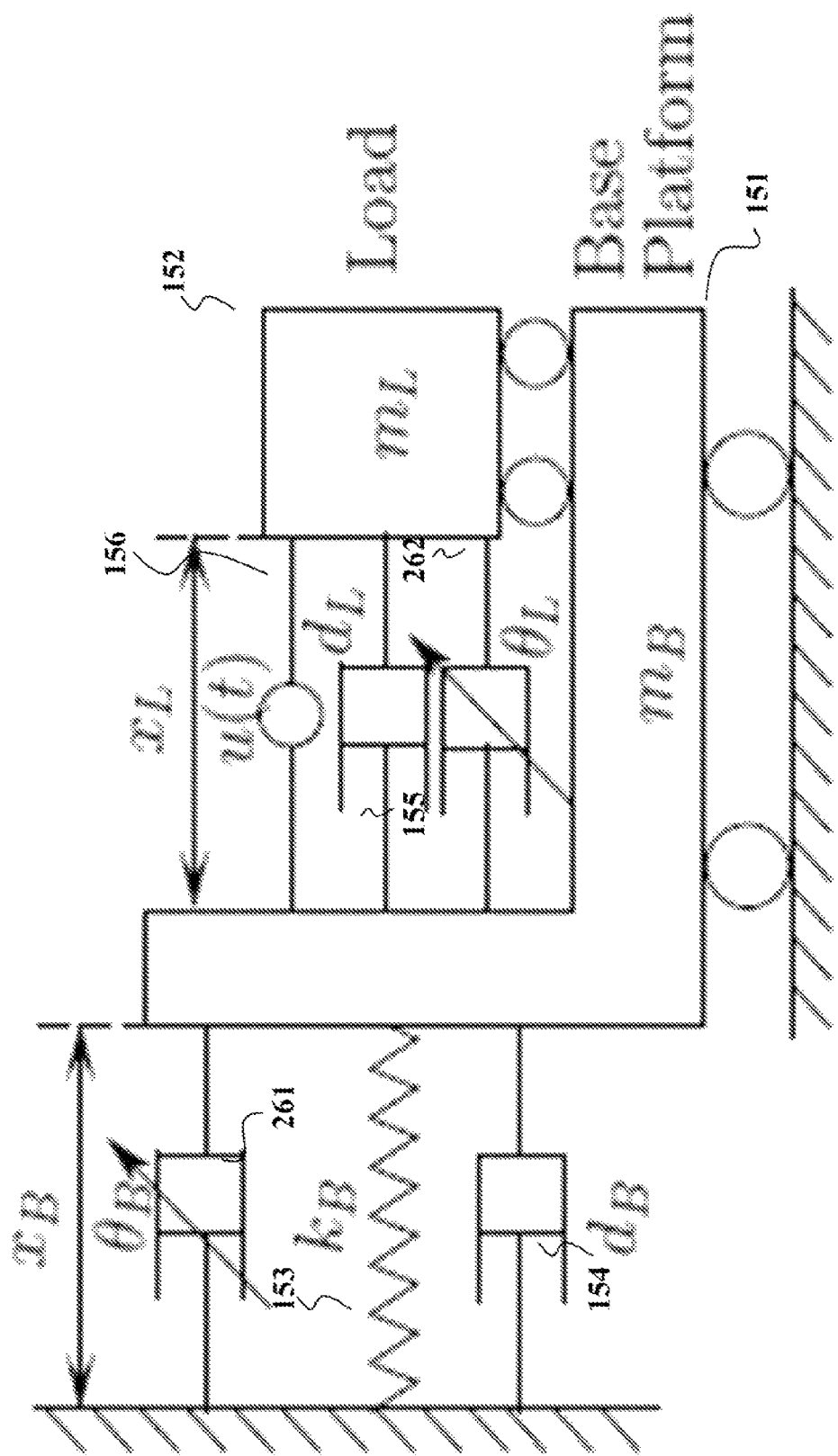

FIGS. 2A, 2B and 2C show schematics of tunable motion control system having adjustable dynamics according to some embodiments of the invention. For example, FIG. 2A shows a tunable single-axis motion control system having an additional tunable actuator 261 installed between a base mass 151 and the ground. The tunable actuator 261 has a tunable parameter $\theta_B$, which allows to tune the dynamics of the motion control system according to different tasks or objectives. An example of the tunable actuator is a semi-active damper with an adjustable damping coefficient or semi-active spring with an adjustable spring stiffness. The adjustable coefficients, for instance $\theta_B$, of tunable actuators are reffered herein as tunable actuator parameters or equivalently tunable mechanical parameters.

FIG. 2B shows another embodiment of the tunable single-axis motion control system, where a tunable actuator 262, with a tunable parameter $\theta_L$, is installed between a load mass 152 and the base mass 151. FIG. 2C shows another embodiment of the tunable single-axis motion control system where two tunable actuators 261 and 262 are installed.

By introducing tunable actuators, the tunable motion control system has adjustable mechanical parameters, denoted by θ, which can be tuned, according to a specific task. The specific task can include, e.g., an initial position and velocity of the load mass, a final position and velocity of the load mass, acceleration and velocity constraints on the load mass, time to accomplish to the task, and a criterion to evaluate an operation of the tunable motion control system.

In one embodiment, the tunable parameter is tuned to a specific value before the performance of the specific task and remains constant during the performance of the specific task. This also differentiates the tunable acutators from the controllable actuators of which parameters can vary during the operation of the tunable motion control system for the specific task. The tunable actuators and controllable actuators work together to improve the performance of the tunable motion control system performing the task.

Figure 2D:
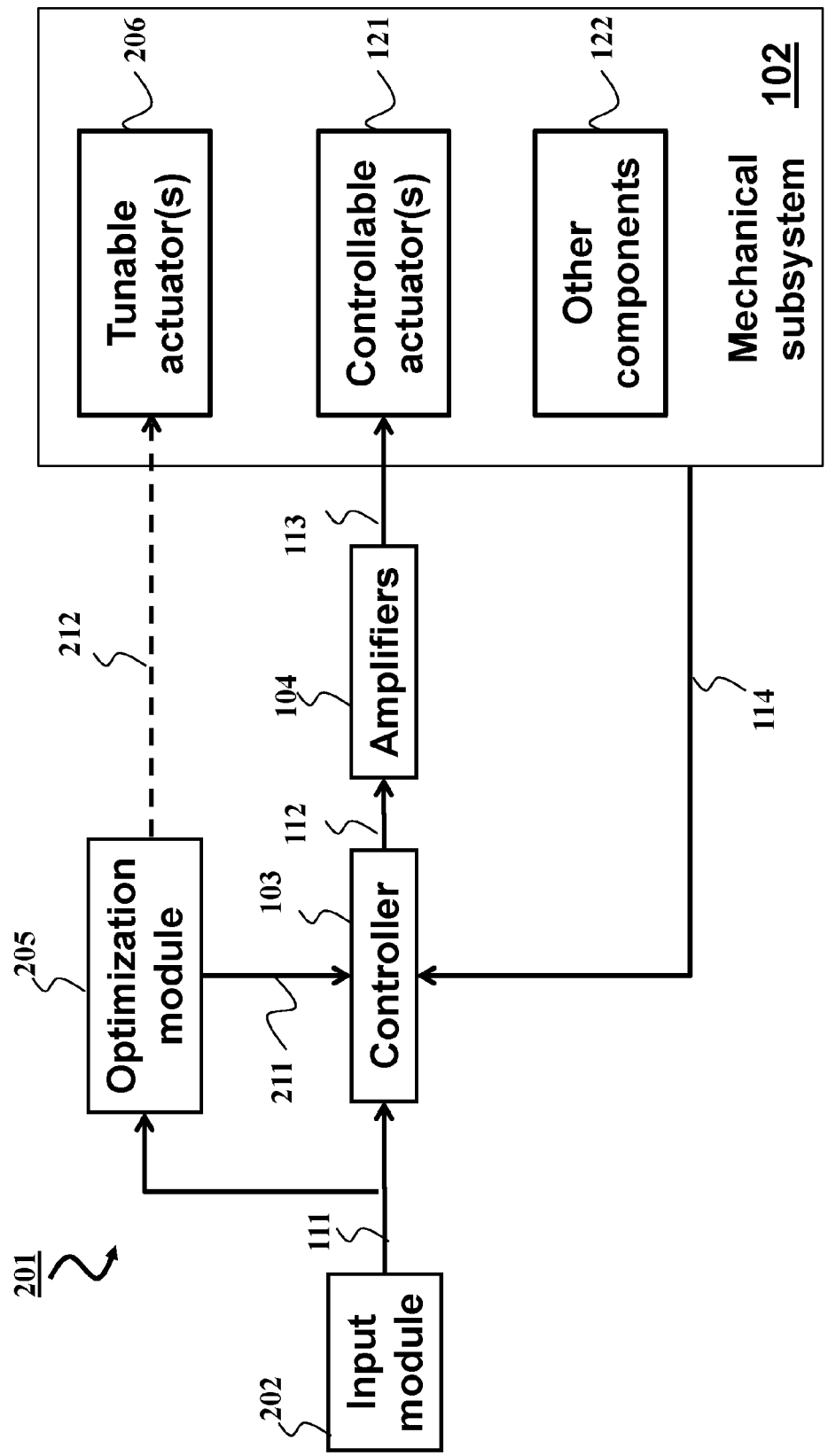

FIG. 2D shows a block diagram of a tunable motion control system 201 according to one embodiment of the invention. The system includes input module 202 for receiving a specific task 111 to perform and an optimization module 205 for jointly selecting the adjustable parameter 212 and the specific control law 211 in response to receiving the specific task 111. The system also includes a controller 103 for controlling a performance of the specific task by the controllable actuator 121 according to the specific control law. A mechanical subsystem 102 includes of at least one tunable actuator 206, at least one controllable actuator 121, and other components 122.

The optimization module 205, based on the specific task 11 and a model of the mechanical subsystem, determines optimal values θ* of the tunable mechanical parameters as an output signal 212, and optimal control policy u* as an output signal 211. The tunable mechanical parameters are essentially parameters of the tunable actuators. The signal 212 is fed into tunable actuators such that the parameters of the tunable actuators are adjusted to optimal values computed by the optimization module. Also, the optimization module outputs new control policy corresponding to the tuned parameters θ* to the controller 103. One embodiment determines the values θ* of the tunable mechanical parameters and the control policy u* by solving the co-design problem in a real time.

After the parameters of tunable actuators are tuned to the optimal values, the control module 103 processes the input signals including the specific task. 111 and a feedback signal 114 reflecting the current operation status of the motion control system, and outputs a control signal 112. The control signal 112 can be amplified by the amplifier 104 to drive 113 the controllable actuators 121, which further move other components 122 to perform tasks specified by the task 111.

Figure 2E:
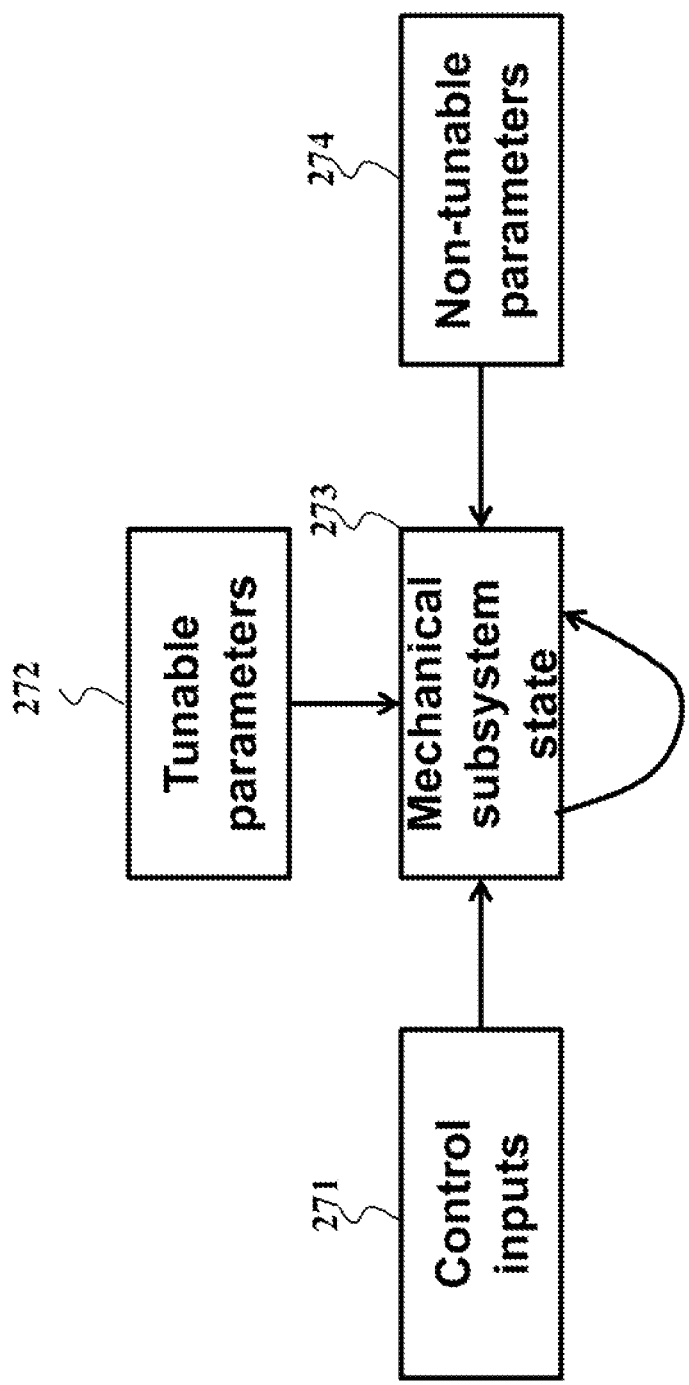

FIG. 2E shows an example of the model of the mechanical subsystem, typically in the form of differential equations, which describe interaction between various variables: control input variables 271, denoted by u, mechanical subsystem state 273, denoted by x, non-tunable mechanical parameters 274, and tunable parameters 272, denoted by θ. The control input represents the output force or torque of the controllable actuators. The tunable parameters can be, e.g., damping coefficients or stiffness constants. The non-tunable parameters characterize the properties of other components 122, for instance an inertia of a rotor of a electric motor if the inertia is not adjustable, or masses of mechanical components. These variables interact with each other to form the mechanical subsystem dynamics or model. The dynamics describing the interplay of these variables can be captured by, for example, a set of differential equations.

The mechanical subsystem model, particularly the values of non-tunable parameters, can be time varying due to aging of the other components 122. In some embodiments, the optimization module and the controller accommodate variations of non-tunable parameters by adjusting values of tunable parameters and inputs of controllable actuators such that the resultant system achieves better performance. Failure to exploit the variation of the mechanical subsystem model necessarily results in incapability to achieve optimal operation of the system.

Figure 2F:
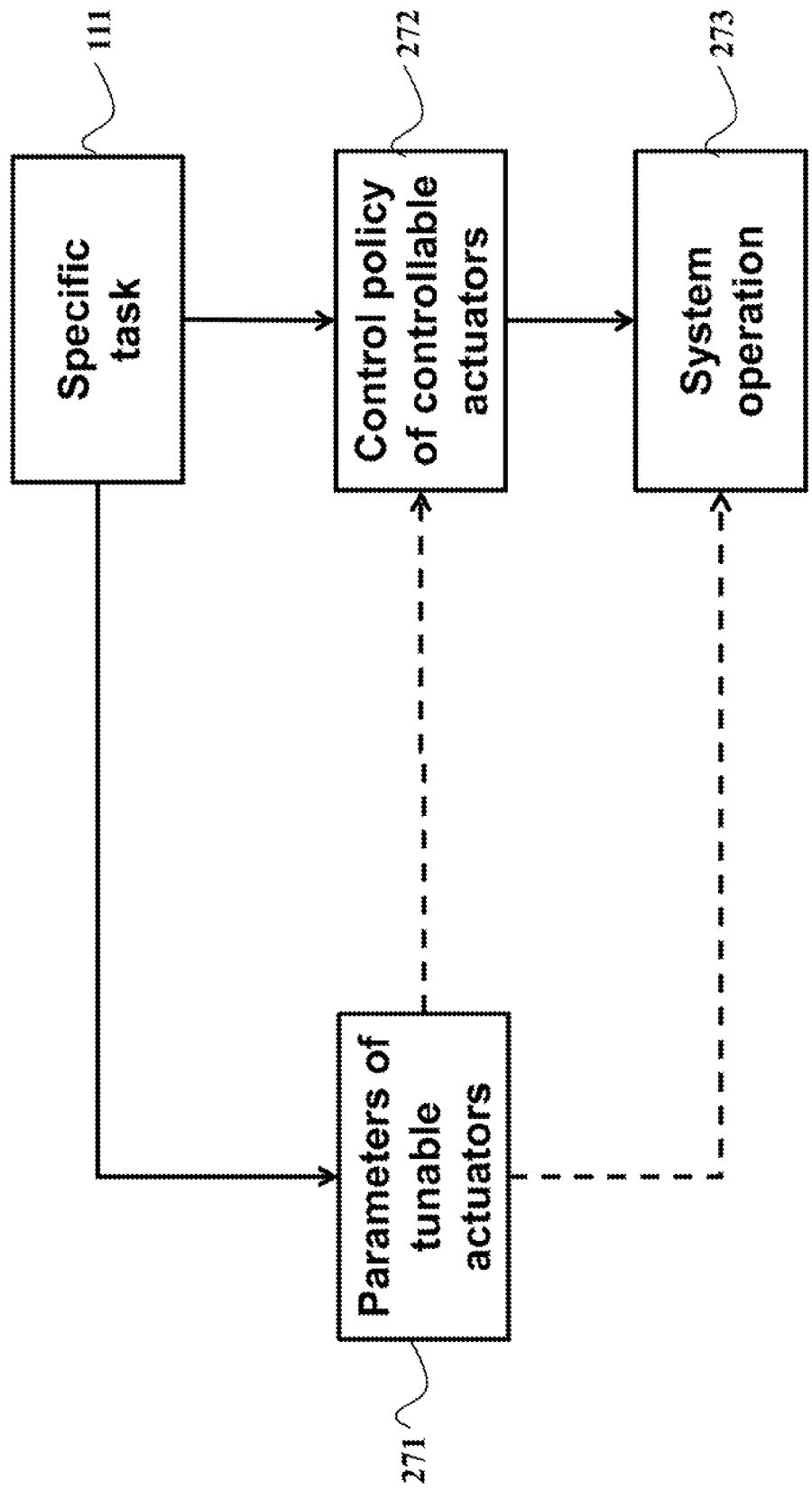

FIG. 2F further illustrates the principles employed by some embodiments. The specific task 111 is used to adjust the tunable parameters θ, as in block 271, and the control policy u, as in block 272. The block 271 is used to adjust the dynamics of the mechanical subsystem and the tunable motion control system, and the block 272 is used to control the controllable actuators which drives the motion of certain mass in the mechanical subsystem or the motion control system according to the inputs.

Design of the Tunable Motion Control System

Figure 3A:
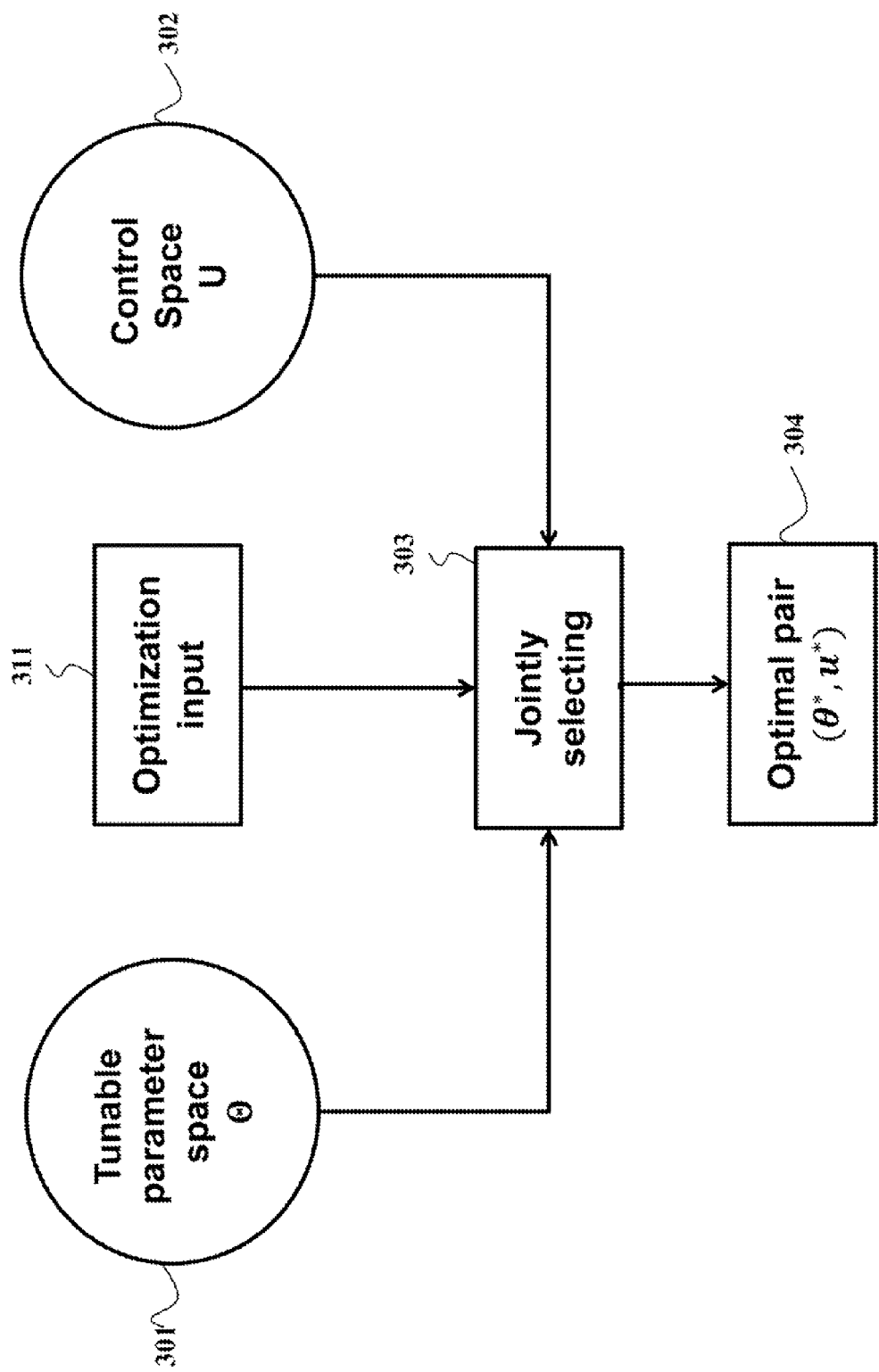
FIGS. 3A, 3B, 3C and 3D are block diagrams to determine tunable mechanical parameters and control law according to some embodiments of the invention.

FIG. 3A shows a schematic of a method for determining an optimal pir of the values of the tunable parameters, denoted by θ* and the optimal control policy, denoted by u* according to the optimization input 311. The optimization input 311 can include cost functions representing the performance of the tunable motion control system, and specific tasks, which defines the movement of the mechanical subsystem. For example, the block 303 jointly selects an optimal pair 304 ($\theta^*$, $u^*$) of tunable parameters and control policy according to the optimization input 311, a specified tunable parameter space $\Theta$, denoted as a block 301, and a control space U, denoted as a block 302.

Figure 3B:
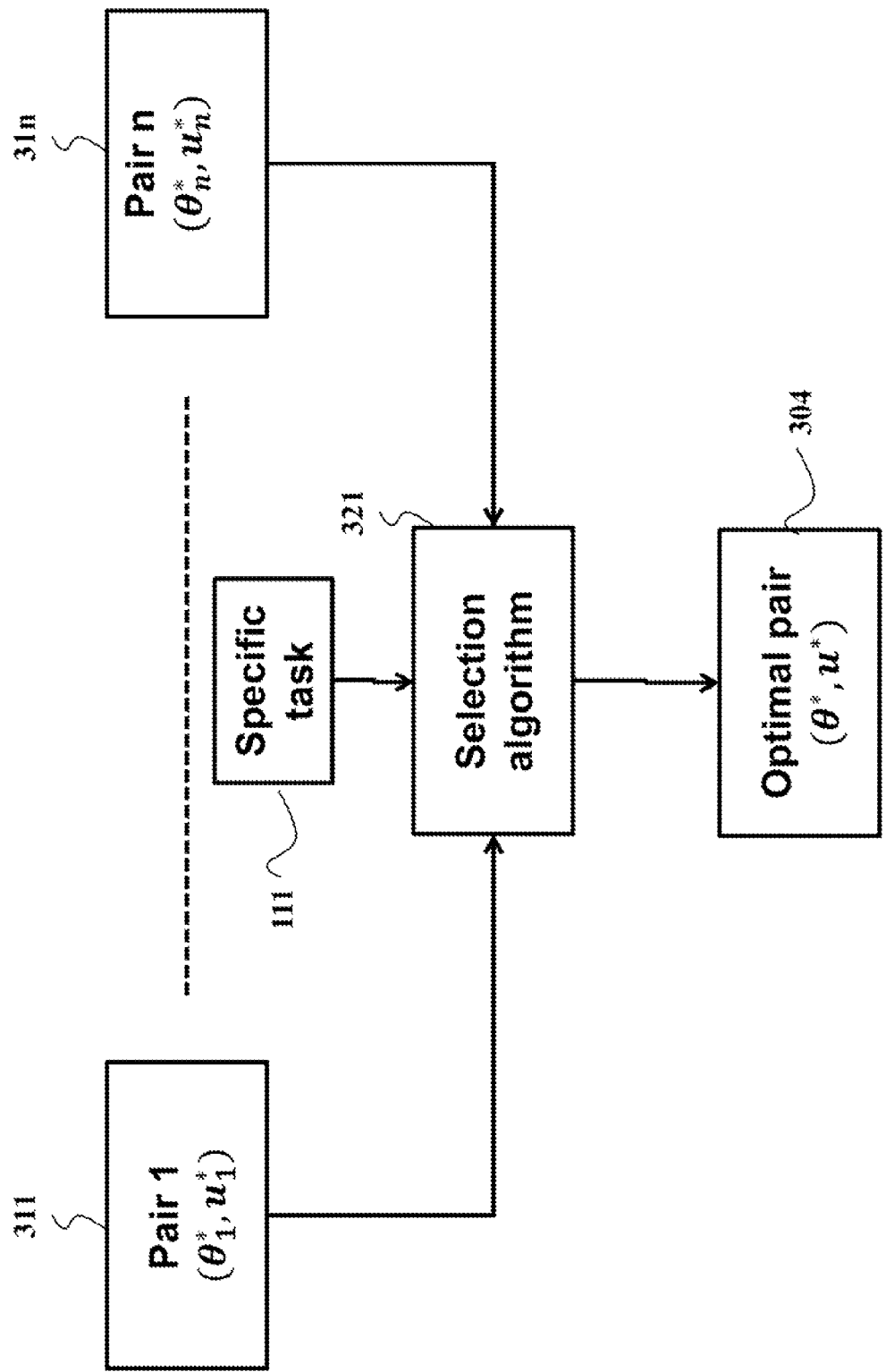

FIG. 3B shows a schematic of a method for determining the optimal pair of tunable parameters and control policy ($\theta^*$, $u^*$) according to another embodiment. This embodiment relies on a table of n pre-computed optimal pairs, denoted by 311, ..., 31n, respectively. Each optimal pair ($\theta_1^*$, $u_1^*$) is computed offline according to a specific user input. For instance, a typical single-axis motion control system task can be described by variables: displacement to move in x direction, denoted by D, and time to finish the movement, denoted by T. It is understood that the optimal pair is a function of D and T. That is: ($\theta^*(D,T), u^*(D,T)$). Given a specific task ($D_i, T_i$), one can have a pair computed offline as ($\theta_i^*, u_i^*$). Given n pairs of ($\theta_i^*, u_i^*$), and a specific new user input denoted by ($D_o, T_o$), the optimal pair corresponding to the new user input can be determined by running interpolation procedures in 2-dimensional space. The interpolation procedure runs in block 321.

Figure 3C:
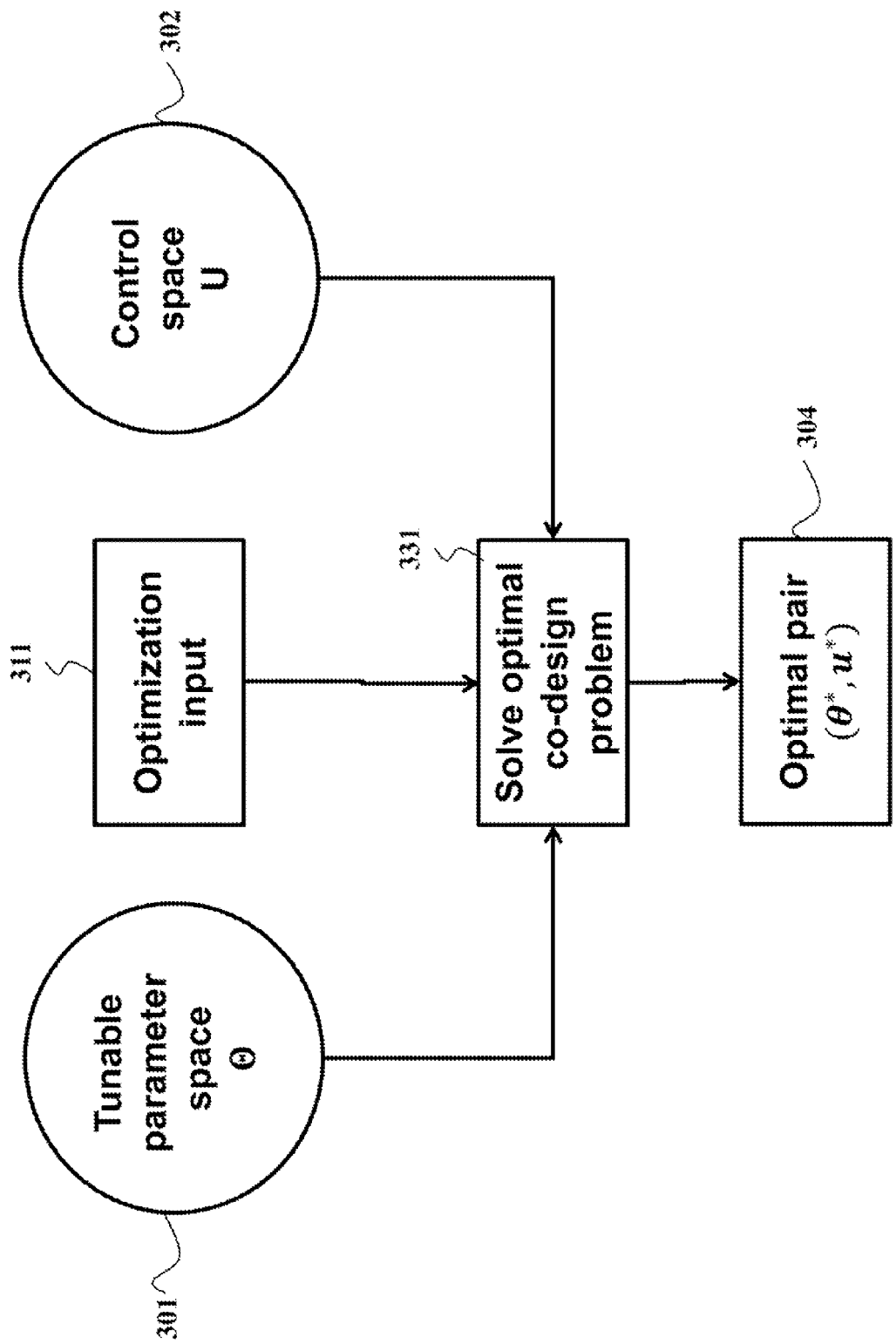

FIG. 3C shows a schematic of a method for determining the optimal pair of tunable parameters and control policy ($\theta^*, u^*$) according to yet another embodiment. This embodiment determines the optimal pair by solving 331 optimal co-design problem. The optimization input includes details about the task of the motion control system, and a cost function to evaluate a pair of tunable parameters and control policy. The optimal co-design problem is solved by a procedure running in block 331, where various pairs selected from the tunable parameter space 301 and the control space U are evaulated according to the cost function, and a optimal pair is selected as the one that optimizes the cost function.

One embodiment of a method solving the optimal co-design problem selects N pairs of ($\theta_i, u_i$) from the space $\Theta \times U$; the mechanical subsystem model with each pair is simulated, and the cost function is evaluated; choose the pair ($\theta_i, u_i$) which optimizes the cost function as the optimal pair. The choice of N pairs of ($\theta_i, u_i$) can be random or deterministic. One deterministic implementation is choosing pairs, which are evenly distributed over the space $\Theta \times U$.

Another embodiment of a method to solve the optimal co-design problem is to choose the optimal pair ($\theta^*, u^*$) by solving an optimization problem. For example, we disclose one embodiment where a mechanical subsystem model of the motion control system is described as a linear time-invariant differential equation $$\dot{x}=A(\theta)x+B(\theta)u \quad (1)$$

where $x \in R^n$ is the mechanical subsystem state 27, also referred to as system state, $u \in R^m$ is the control input 271, generally outputs of controllable actuators 121, and $\theta \in R^l$ is the vector of tunable mechanical parameters 272 corresponding to tunable parameters of tunable actuators 206. For instance, $\theta$ represents viscous damping coeffcients if the tunable actuators are dampers, or represents stiffness constants if the tunable actuators are springs. The tunable mechanical subsystem parameters are to be designed with $\theta_{max} \in R^l$ and $\theta_{min} \in R^l$ its upper bound and lower bound, respectively. System matrices $A(\theta) \in R^{n \times n}$ and $\beta(\theta) \in R^{n \times m}$ are linear functions of $\theta$, and the pair [$A(\theta), B(\theta)$] is assumed to be stabilizable, if $\theta_{min} \le \theta \le \theta_{max}$.

In one embodiment, the optimal operation of the motion control system is characterized by an objective function or a cost function. One embodiment of the cost function is defined as follows $$J(\theta, u) = \int_0^\infty (x^T Q x + u^T R u) dt, \ x(0)=x_0, \quad (2)$$

where $x(0)=x_0$, represents the initial state of the system, $Q=Q^T \ge 0$, $R=R^T > 0$, and the pair [$A(\theta), Q^{1/2}$] is assumed to be observable, if $\theta_{min} \le \theta \le \theta_{max}$. The optimal co-design problem is to find simultaneously a vector $\theta$ and a control policy u such that the cost in equation (2) is minimized. Here, the control policy is any piecewisely continuous function over time, thus the control space U is an infinite dimensional space.

Given the mechanical subsystem model in equation (1) and the cost function (2) characterizing the optimal operation of the motion control system, an optimal co-design problem using optimization technique can be formulated as follows $$\min_{\theta,u} \ J(\theta, u) = \int_0^\infty (x^T Q x + u^T R u) dt, \ x(0) = x_0 \quad [P1]$$

subject to $$\dot{x} = A(\theta)x + B(\theta)u$$

$$u \in \mathfrak{R}^m$$

$$\theta_{min} \le \theta \le \theta_{max}$$

Figure 3D:
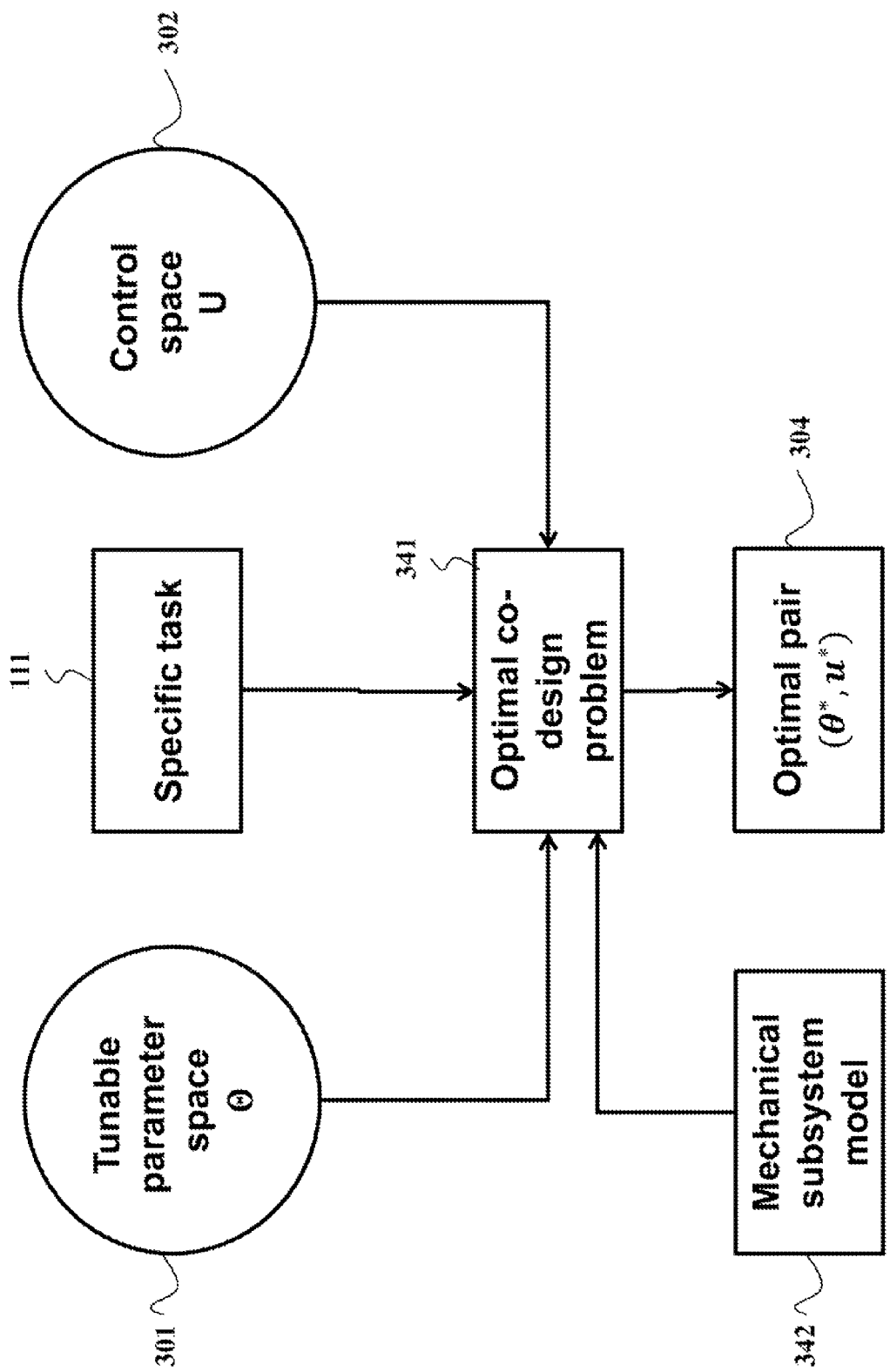

FIG. 3D illustrate the optimal co-design problem [P1], where the optimal co-design problem, represented by block 341, is defined on a mechanical subsystem model 342, a tunable parameter space $\Theta$, a control space U, and user inputs 202 including motion task details and cost function. The block 331 solves the optimal co-design problem 341 to produce a optimal pair ($\theta^*$, $u^*$).

Figure 4A:
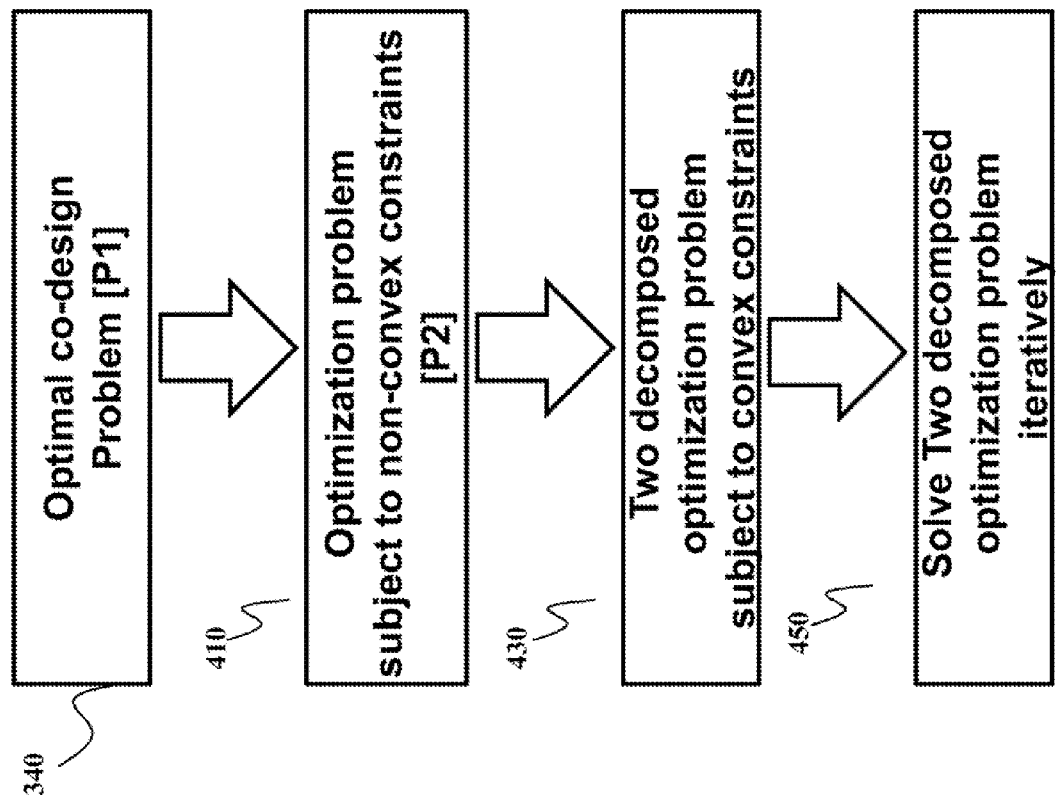

FIG. 4A shows a block diagram of a method for solving co-design problem [P1] 340 according to some embodiments. Problem [P1] is an optimization problem over infinite dimensional space, thus difficult to solve. One embodiment of this invention selects a parameterization of control policy as a linear function of the system state, denoted by x in equation (1) such as $$u=Kx.$$

Thus the optimization problem [P1] is reduced to a finite-dimensional optimization problem. One embodiment of this invention further discloses reduction of Problem [P1] to an optimization problem subject to non-convex constraints [P2] corresponding to block 410. The resultant problem [P2] is still non-convex due to presence of non-convex constraints. Due to the parametrization of system matrices A and B as linear functions of tunable parameters, the optimization problem [P2] can be further reduced to two decomposed optimization problems subject to convex constraints, denoted by [SP1] and [SP2], as block 430. Finally, block 450 solves the two decomposed optimization problems [SP1] and [SP2] iteratively to produce a solution of Problem [P2].

One embodiment of reduction [P1] to [P2] is given as follows. To guarantee the existence of a finite cost with non-trivial initial state, it is natural to require that the closed-loop system matrix $$A_c(\theta, K) := A(\theta) + B(\theta)K \quad (3)$$

is a Hurwitz matrix. Then, by linear optimal control theory, there exists a symmetric positive definite matrix P (called cost matrix), such that $$J(\theta, K) = x_0^T \int_0^\infty e^{A_c(\theta,K)^T t}(Q + K^T RK)e^{A_c(\theta,K)t} dt x_0 = x_0^T P x_0. \quad (4)$$

For those skilled in the art, it is understood that P is the unique positive definite solution of the Lyapunov equation $$0 = A_c(\theta,K)^T P + PA_c(\theta,K) + Q + K^T RK \quad (5)$$

Hence, the above mentioned optimal co-design problem [P1] is equivalent, in some sense, to the following optimization problem referred to as [P2]:

$$\min_{\theta,K,P} x_0^T P x_0 \quad (6)$$

$$\text{s.t. 1) } 0 = A_c(\theta, K)^T P + PA_c(\theta, K) + Q + K^T RK \quad (7)$$

$$2) A_c(\theta, K) \text{ is Hurwitz} \quad (8)$$

$$3) \theta_{min} \leq \theta \leq \theta_{max}. \quad (9)$$

Problem [P2], which includes variables θ,K,P as decision variables, is different from [P1] where decision variables are θ,K. Problem [P2] is however equivalent to [P1] in the sense that optimal solutions of both problems is the same. Problem [P2] is easier to solve and takes less computation to solve than [P1], because solving [P1] requires simulating the system (1). Solving Problem [P1] directly usually requires simulation of the mechanical subsystem model with each pair of (θ,u), which is time consuming, if not impossible.

Solving problem [P2] is still challenging for at least two reasons. First, due to the coupling between the tunable mechanical parameters and the control input, Constraint (7) is generally non-convex with respect to decision variables θ, K, and P. Second, Constraint (8) is not only nonlinear but also difficult to be analytically formulated, especially for high-dimensional systems.

Iterative techniques based on system equivalence [Grigoriadis et al., 1993, Skelton and Kim, 1992, Lu and Skelton, 2000] can be employed to solve this optimization problem. The method is summarized as follows.

Given $\theta_0$ satisfying $\theta_{min} \leq \theta_0 \leq \theta_{max}$ repeat the following two steps with i=0, 1, ..., until convergence.
1) Linear-quadratic-regulator (LQR) design
Solve for $P_i = P_i^T > 0$ from $$0 = A_c(\theta_i, K_i)^T P_i + P_i A_c(\theta_i, K_i) + Q + K_i RK_i \quad (10)$$

where $K_i = -R^{-1}B^T P_i$.
2) System-Equivalence-Based Redesign
Improve the mechanical parameters and the control policy together by solving the optimization problem.

$$(\theta_{i+1}, \overline{K}_i) = \min_{\theta,K} \int_0^\infty e^{A(\theta_i,K_i)^T t}(K^T RK)e^{A(\theta_i,K_i)t} x \, dt \quad (11)$$

s.t.

$$A(\theta, K) = A(\theta_i, K_i) \quad (12)$$

The procedure described in (10)-(12) has two drawbacks. First, the set of feasible solutions of the optimization problem (11)-(12) is strongly restricted compared with Problem [P2], due to the conservative constraint (12). Second, solving the problem (11)-(12) is non-trivial because the constraint (12) is generally nonlinear and non-convex.

Figure 4B:
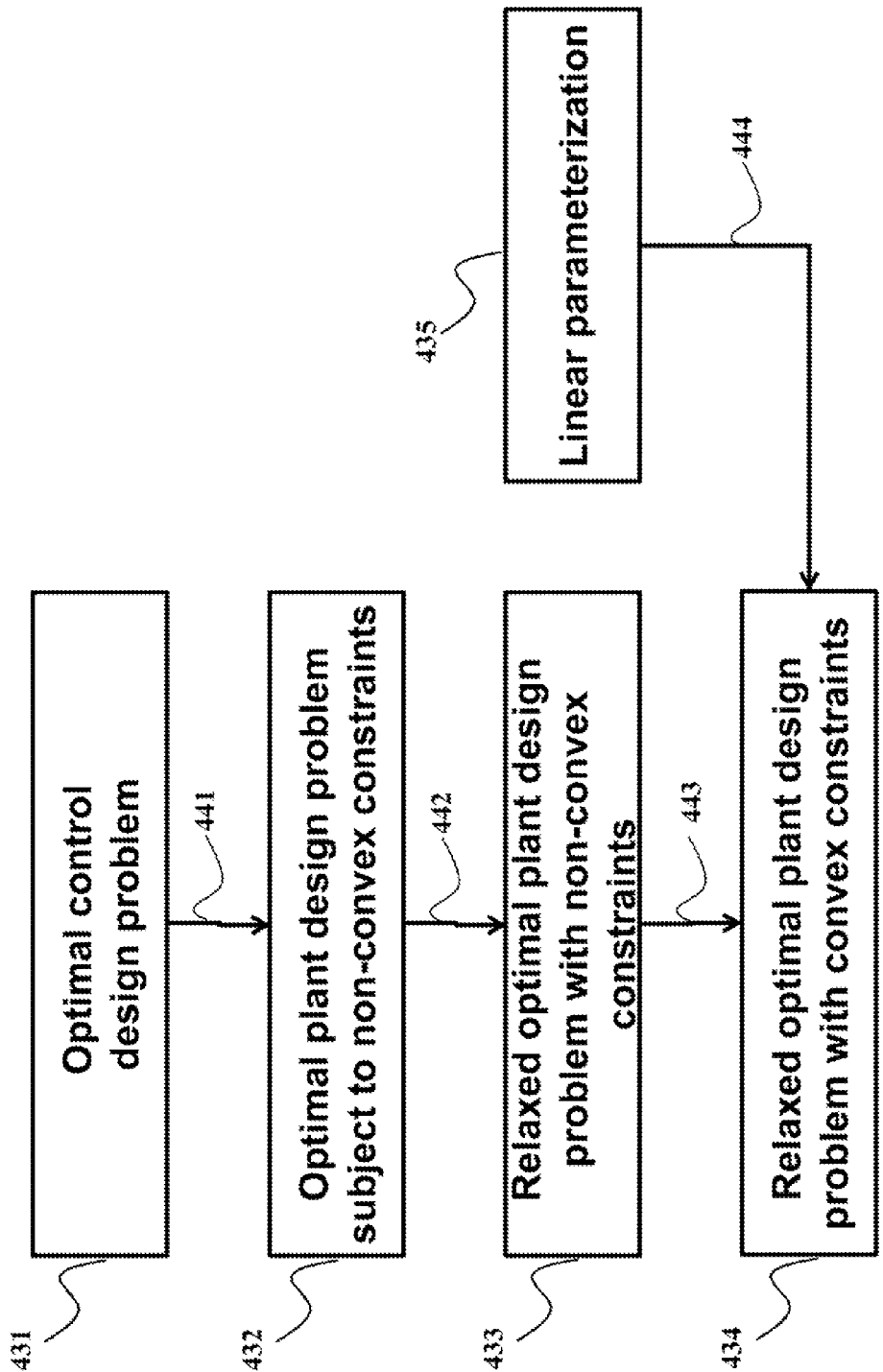

As shown in FIG. 4B, one embodiment of this invention decomposes the problem [P2] into two sub-problems: an optimal control design problem [SP1] 431, and an optimal mechanical design problem [SP2] 432. The optimal control design problem [SP1] is to solve a control policy 441, represented by the matrix K, given fixed values of tunable mechanical parameters, and the optimal mechanical design problem [SP2] is to solve an optimal mechanical parameters and the cost matrix P given fixed values of the K. The optimal mechanical design problem [SP2] is non-convex and difficult to solve.

Given fixed values of tunable mechanical parameters, [SP1] can be readily solved for those skilled in the art as a convex optimization problem. It is of particular interest to develop a general method for transforming the optimal mechanical design problem [SP2] subject to non-convex constraints to another optimization problem with convex constraints, called a transformed [SP2]. Then, the optimal values of tunable mechanical parameters θ and the cost matrix P, given fixed control parameters K, can be uniquely determined by solving the transformed [SP2]. This invention teaches relaxation of the optimal mechanical design problem [SP2] into a relaxed optimal mechanical design problem with non-convex constraints, corresponding to block 433 in FIG. 4B, as an intermediate step, then combining with parameterization of system matrices A and B as linear functions of tunable mechanical parameters θ, as shown in block 435, the relaxed optimal mechanical design problem with non-convex constraints is reduced to a relaxed optimal mechanical design problem with convex constraints, as in block 434.

One embodiment of the optimal mechanical design problem [SP2] is given as follows. Suppose a pair $(\theta_i, K_i)$ is given, with $\theta_{min} \leq \theta_i \leq \theta_{max}$, and $A_c(\theta_i, K_i)$ Hurwitz. Then, we give the following optimal mechanical design problem [SP2]:

$$(\theta_{i+1}, S_i) = \underset{\theta,S}{\text{argmin}} \ x_0^T S x_0 \quad (13)$$

$$\text{s.t. 1) } A_c(\theta, K_i)^T S + S A_c(\theta, K_i) + Q + K_i^T R K_i = 0 \quad (14)$$

$$2) A_c(\theta, K_i) \text{ is Hurwitz} \quad (15)$$

$$3) \theta_{min} \leq \theta \leq \theta_{max}. \quad (16)$$

Similar to Problem [P2], the sub-problem [SP2] is non-convex due to constraints (14)-(15).

One embodiment transforms the [SP2] into an optimization problem subject to convex constraints, i.e. the transformed [SP2], is given as follows. This embodiment relaxes [SP2] by replacing the first constraint (14) with an inequality constraint. An embodiment of the relaxed optimal mechanical design problem with non-convex constraints or block 433 is shown below:

$$(\overline{\theta}_{i+1}, \overline{S}_i) = \underset{\overline{\theta},S}{\text{argmin}} \ x_0^T \overline{S} x_0 \quad (17)$$

$$\text{s.t. 1) } A_c(\overline{\theta}, K_i)^T \overline{S} + \overline{S} A_c(\overline{\theta}, K_i) + Q + K_i^T R K_i \leq 0 \quad (18)$$

$$2) A_c(\overline{\theta}, K_i) \text{ is Hurwitz} \quad (19)$$

$$3) \theta_{min} \leq \overline{\theta} \leq \theta_{max}. \quad (20)$$

This invention shows the relaxation does not yield different solutions, i.e., the relaxed optimal mechanical design problem with non-convex constraints and the Problem [SP2] have the same optimal solution, i.e., $x_0^T S_i x_0 = x_0^T \bar{S}_i x_0$.

The relaxation of the equality constraint and the parameterization of system matrices as linear functions of tunable mechanical parameters θ enables an elimination of the non-convexity and nonlinearity in (14) and (15) by deriving some sufficient conditions for these two constraints using Schur complement condition to produce the relaxed optimal mechanical design problem with convex constraints, which is also referred to as the transformed [SP2].

One embodiment of sufficient conditions for non-convex constraints is given as follows. Indeed, let us define $P_i = P_i^T > 0$ as the positive definite solution of $$A_i^T P_i + P_i A_i + Q + K_i^T R K_i = 0. \tag{22}$$

where $A_i = A_c(\theta_i, K_i)$. Also, let $\Delta A_i(\bar{\theta}) = A(\bar{\theta} - \theta_i) + B(\bar{\theta} - \theta_i) K_i$, and $\Delta P(\bar{S}) = \bar{S} - P_i$. The sufficient conditions for (18) and (19) to be satisfied are given by the following two linear matrix inequalities $$\begin{bmatrix} M(\bar{S}, \bar{\theta}) & \Delta P_i(\bar{S}) & \Delta A_i(\bar{\theta})^T \\ \Delta P_i(\bar{S}) & I_n & 0 \\ \Delta A_i(\bar{\theta}) & 0 & I_n \end{bmatrix} \geq 0 \tag{23}$$

$$\bar{S} > 0. \tag{24}$$

where $$M(\bar{S}, \bar{\theta}) = -\Delta P_i(\bar{S}) A_i - A_i^T \Delta P_i(\bar{S}) - \Delta A_i(\bar{\theta})^T P_i - P_i \Delta A_i(\bar{\theta}) \tag{25}$$

Equations (23) and (24) give two linear matrix inequalities when $\bar{S}$ and $\bar{\theta}$ are viewed as the decision variables, i.e. constraints (23)-(24) are convex. Replacing (18) and (19) with (23) and (24), the relaxed optimal mechanical design problem with non-convex constraints becomes a semi-definite programming which does not involve non-convexity or nonlinearity, and can be solved using convex optimization solvers.

Embodiments of Solving the Optimal Co-Design Problem

FIG. 4C shows a block diagram of a method that uses an iterative technique for solving the problem [P2] according to one embodiment.

1) Initialization, block 451

Let $\theta_0$ and $K_0$ satisfy $\theta_{min} \leq \theta_0 \leq \theta_{max}$, and $A_c(\theta_0, K_0)$ is Hurwitz. Let i=0.

2) Solve the optimal control design problem [SP1] by policy evaluation, block 452

Solve for $P_i = P_i^T > 0$ from $$0 = A_i^T P_i + P_i A_i + Q + K_i^T R K_i \tag{28}$$

where $A_i = A_c(\theta_i, K_i)$.

3) Solve the relaxed optimal mechanical design problem with convex constraint or the transformed [SP2], block 453

$$(\theta_{i+1}, \Delta P_i) = \underset{\theta, \Delta P}{\operatorname{argmin}} \; x_0^T \Delta P x_0 \tag{29}$$

$$\text{s.t.} \begin{bmatrix} -\Delta P A_i - A_i^T \Delta P - \Delta A_i^T P_i - P_i \Delta A_i & \Delta P & \Delta A_i^T \\ \Delta P & I_n & 0 \\ \Delta A_i & 0 & I_n \end{bmatrix} \geq 0 \tag{30}$$

$$\Delta P + P_i > 0 \tag{31}$$

$$\theta_{min} \leq \theta \leq \theta_{max} \tag{32}$$

where $\Delta A_i = A(\theta - \theta_i) + B(\theta - \theta_i) K_i$, and update the control policy by $$K_{i+1} = -R^{-1} B(\theta_{i+1})^T (P_i + \Delta P_i) \tag{33}$$

4) Stopping criterion, block 454

Stop, if $|P_i - P_{i-1}| < \epsilon$, with $\epsilon > 0$ is a predefined sufficiently small constant to output 455 the optimal pair. Otherwise, go to Step 2) with i replaced by i+1.

Figure 5:
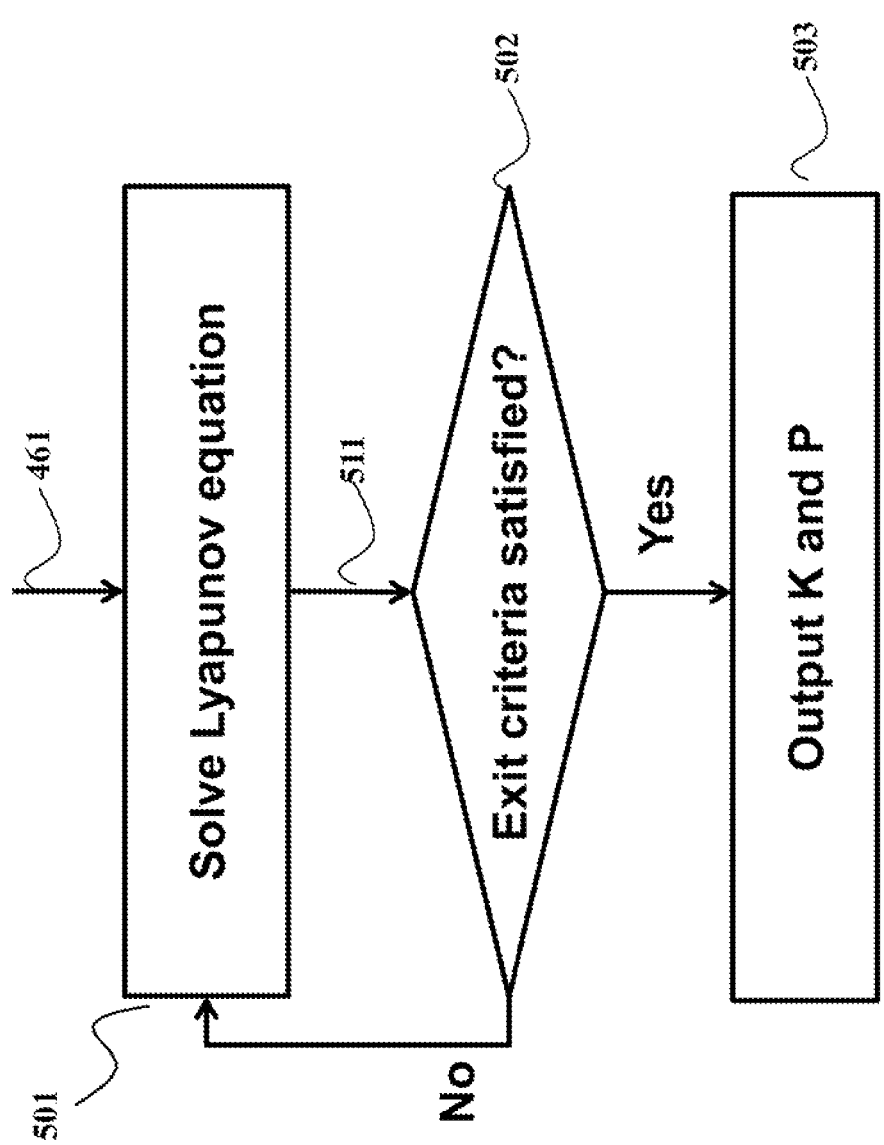
FIG. 5 is a block diagram of a method to solve an optimal control design problem according to some embodiments of the invention.

FIG. 5 shows an example of implementation of Step 2) or block 452. Block 501 solves Lyapunov equation (28) to give a cost matrix $P_i$. The cost matrix $P_i$ can be used to update the $K_i$. Repeat solving Lyapunov equation 501 with the updated $K_i$ for a new $P_i$ until a termination criteria met. One termination criteria can be, for instance, the absolute difference between the cost matrix $P_i$ and the new cost matrix is less than a small positive constant.

For i=0, 1, 2, . . . , the following properties of the procedure described in (28)-(33) hold.

1. $A_i$ is Hurwitz.

2. $0 \leq x_0^T P_{i+1} x_0 \leq x_0^T (P_i + \Delta P_i) x_0 \leq x_0^T P_i x_0$.

3. There exists $J^* > 0$, such that $\lim_{i \to \infty} J(\theta_i, K_i) = J^*$.

FIG. 4D shows a block diagram of a method that uses an iterative technique for solving the problem [P2] according to another embodiment.

1) Initialization, block 456

Let $\theta_0$ satisfy $\theta_{min} \leq \theta_0 \leq \theta_{max}$, and $K_o = 0$. Let i=0.

2) Solve the optimal control design problem [SP1] by solving algebraic Riccati equation, block 457

If i=0, solve for $P_i = P_i^T > 0$ from $$0 = A_i^T P_i + P_i A_i + Q - P_i B_i R^{-1} B_i^T P_i \tag{28}$$

where $A_i = A_c(\theta_i, K_i)$ Update the control policy $K_i = -R^{-1} B(\theta_i)^T P_i$.

If i>0, solve for $P_i = P_i^T > 0$ from $$0 = A_i^T P_i + P_i A_i + Q + K_i^T R K_i$$

3) Solve the relaxed optimal mechanical design problem with convex constraint or the transformed [SP2], block 453

$$(\theta_{i+1}, \Delta P_i) = \underset{\theta, \Delta P}{\operatorname{argmin}} \; x_0^T \Delta P x_0 \tag{29}$$

$$\text{s.t.} \begin{bmatrix} -\Delta P A_i - A_i^T \Delta P - \Delta A_i^T P_i - P_i \Delta A_i & \Delta P & \Delta A_i^T \\ \Delta P & I_n & 0 \\ \Delta A_i & 0 & I_n \end{bmatrix} \geq 0 \tag{30}$$

$$\Delta P + P_i > 0 \tag{31}$$

$$\theta_{min} \leq \theta \leq \theta_{max} \tag{32}$$

where $\Delta A_i = A(\theta - \theta_i) + B(\theta - \theta_i) K_i$, and update the control policy by $$K_{i+1} = -R^{-1} B(\theta_{i+1})^T (P_i + \Delta P_i). \tag{33}$$

4) Termination criterion, block 454

Terminate, if $|P_i - P_{i-1}| < \epsilon$, with $\epsilon > 0$ a predefined sufficiently small constant. Otherwise, go to Step 2) with i replaced by i+1.

Results obtained from the method depend on the initial condition of the system state. To reduce the sensitivity, with respect to the error, between the actual initial state and its nominal value, the following two schemes can be adopted:

1. Replace the cost (6) with $$J(\theta, K) = \sum_{i=1}^{N} w_i x_i^T P x_i \qquad (37)$$

where $x_1, \ldots, x_N$ are N possible initial state with $w_1, \ldots, w_N > 0$ their weights. Notice that this modification does affect the linearity in the optimal mechanical design problem (29)-(32).

2. Replace the constraint (31) with $$-P_i < \Delta P \leq 0. \qquad (38)$$

Constraint (38) implies that, the value of the cost function will be less or equal to the LQR cost with $\theta = \theta_0$ for all initial conditions. Again, solvability of the problem will not be affected.

Exemplar Applications of Some Embodiments

One embodiment of this invention is applied to deploy a tunable motion control system as shown in FIG. 2C. The mechanical subsystem model can be described by the following continuous-time linear time-invariant differential equations $$\ddot{x}_L = (u - d_L \dot{x}_L)\left(\frac{1}{m_L} + \frac{1}{m_B}\right) + \frac{k_B}{m_B} x_B + \frac{d_B}{m_B} \dot{x}_B, \qquad (42)$$

$$\ddot{x}_B = (d_L \dot{x}_L - u)\frac{1}{m_B} - \frac{k_B}{m_B} x_B - \frac{d_B}{m_B} \dot{x}_B, \qquad (43)$$

where $x_L$ and $x_B$ denote the relative displacement of the load mass 152 with respect to the base platform 151, and the displacement of the base platform. $d_L$, $m_B$, $m_L$, $k_B$, and $d_B$ are constant system parameters whose values are to be determined according to a specific task.

The determination of a optimal pair of tunable mechanical parameters and control policy is to be achieved by optimzing the system performance in tracking a step command task. For this purpose, we define $x_1 = x_L - y_d$, with $y_d$ the optimal constant displacement of the load mass, $x_2 = \dot{x}_L$, $x_3 = x_B$, and $x_4 = \dot{x}_B$. Then the mechanical subsystem model is converted to $$\dot{x} = Ax + Bu, \qquad (44)$$

where $x = [x_1, x_2, x_3, x_4]^T$, $$A = \begin{bmatrix} 0 & 1 & 0 & 0 \\ 0 & -\frac{d_L}{m_L} - \frac{d_L}{m_B} & \frac{k_B}{m_B} & \frac{d_B}{m_B} \\ 0 & 0 & 0 & 1 \\ 0 & \frac{d_L}{m_B} & -\frac{k_B}{m_B} & -\frac{d_B}{m_B} \end{bmatrix}, \text{ and } B = \begin{bmatrix} 0 \\ \frac{1}{m_L} + \frac{1}{m_B} \\ 0 \\ -\frac{1}{m_B} \end{bmatrix}.$$

The cost to be minimized is $$J(\theta, u) = \int_0^\infty (1000 x_1^2 + 0.1 u^2) dt, \qquad (45)$$

where $$\theta = \left[\frac{1}{m_L}, \frac{1}{m_B}, \frac{k_B}{m_B}, \frac{d_B}{m_B}\right]^T,$$

and the lower bounds, upper bounds, and initial values are predetermined.

The initial state of the mechanical subsystem is set to be $x_0 = [-1, 0, 0, 0]^T$, and the initial stabilizing control policy is chosen as the LQR control policy. The initial cost is $J = 215.3952$. The stopping criterion is set as $\epsilon = 0.02$. The procedure stops after 24 iterations. For comparison purpose, we have also computed this optimal co-design problem using the system-equivalence-based method described in (10)-(12). By applying the embodiment of invention, the system performance has been improved by more than 20%.

Various embodiments of the invention can be operated by numerous general purpose or special purpose computing systems or configurations. For example, the embodiments may be implemented using hardware, software or a combination thereof. When implemented in software, the software code can be executed on any suitable processor or collection of processors, whether provided in a single computer or distributed among multiple computers.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A motion-control system for moving a mass according to different tasks, comprising:
   a processor;
   a memory coupled to the processor and storing program instructions executable by the processor:
   a controller in communication the processor and at least one controllable actuator, wherein the at least one controllable actuator performs the different tasks;
   an input module in communication with the controller, for receiving a specific task to perform, such that a performance of the specific task is controlled by the controller;
   a tunable actuator having a tunable parameter of mechanical response, wherein the tunable actuator is mechanically arranged in the system, such that different values of the tunable parameter change dynamics of the system; and
   an optimization module for jointly selecting a value of the tunable parameter from a set of tunable parameters, and a specific control action from a set of control actions, based on optimizing the performance of the specific task, such that optimizing the performance of the specific task optimizes the performance of the controllable actuator controlling the movement of the mass, wherein the optimization module selects an optimal pair of the value of the tunable parameter and the specific control action based on transforming non-convex constraints into convex constraints.

2. The system of claim 1, wherein the tunable parameter is constant during the performance of the specific task, and a parameter of the controllable actuator varies during the performance of the specific task.

3. The system of claim 1, wherein the controller determines a control signal based on the specific task, a feedback signal received in response to the performance of the specific task, and the specific control action.

4. The system of claim 1, further comprising:
   determining the tunable parameter based on a model of the system; and adjusting the tunable parameter in response to a change in the model.

5. The system of claim 1, wherein the optimization module optimizes a cost function representing the performance of the specific task and the value of the tunable parameter and the specific control action according to the cost function.

6. The system of claim 1, wherein the optimization module simulates the performance of the specific task to evaluate a cost function for each pair i in a set of N pairs ($\theta_i$, $u_i$) of values of the tunable parameter $\Theta$ and the specific control action $u_i$, and selects the pair corresponding to a minimal value of the cost function.

7. The system of claim 1, wherein the optimization module determines the tunable parameter by optimizing a cost function representing at least a joint operation of the controllable actuator and the tunable actuator, wherein the solving includes:
   parameterizing an optimal control policy as a linear function of the system state; reformulating the optimization module as a second optimization module having tunable parameters, control parameters and a cost matrix parameterizing a cost as decision variables subject to non-convex constraints;
   partitioning the second optimization module into an optimal control design module by optimizing a control of the controllable actuator with a fixed value of the tunable parameter of the tunable actuator and an optimal mechanical design module optimizing a value of the tunable parameter of the tunable actuator and the cost matrix subject to the non-convex constraint;
   transforming the optimal mechanical design module into a relaxed optimal mechanical design module subject to convex constraints; and
   solving the optimal control design module and the optimal mechanical design module iteratively to produce the value of the tunable parameter and the specific control action.

8. The system of claim 3, further comprising:
   an amplifier for driving the controllable actuator according to the control signal.

9. The system of claim 4, wherein the change is based on aging of components of the system.

10. The system of claim 7, wherein the transforming relaxes non-convex constraints $$A_c(\overline{\theta},K_i)^T\overline{S}+\overline{S}A_c(\overline{\theta},K_i)+Q+K_i^TRk_i \leq 0,$$

$$A_c(\overline{\theta},K_i) \text{ is Hurwitz,}$$

wherein $A_c(\overline{\theta},K_i):=A(\overline{\theta})+B(\overline{\theta})K_i$, $\overline{\theta}$, $\overline{S}$ are decision variables, $K_i$, Q, R are constant matrices.

11. The system of claim 7, wherein the solving the optimal control design module based on initial tunable mechanical parameters produces a control action and a cost matrix for solving the optimal mechanical design module.

12. The system of claim 7, wherein solving the optimal control design module includes solving an algebraic Riccati equation or a policy evaluation, wherein
   the policy evaluation is based on an initial control policy stabilizing the system and a Lyapunov equation $$0=A_i^TP_i+P_iA_i+Q+K_i^TRK_i$$

where $A_i$, $K_i$, Q, R are known matrices, and $P_i$ is an unknown matrix to be solved during the $i^{th}$ iteration of the policy evaluation.

13. The system of claim 10, wherein the non-convex constraints are relaxed to two linear matrix inequalities $$\begin{bmatrix} M(\overline{S},\overline{\theta}) & \Delta P_i(\overline{S}) & \Delta A_i(\overline{\theta})^T \\ \Delta P_i(\overline{S}) & I_n & 0 \\ \Delta A_i(\overline{\theta}) & 0 & I_n \end{bmatrix} \geq 0,$$

$$\overline{S} > 0.$$

wherein $\Delta A_i(\overline{\theta})=A(\overline{\theta}-\theta_i)+B(\overline{\theta}-\theta_i)K_i$ is linearly parameterized by $\overline{\theta}$, A, $\theta_i$, B are known matrices, $\Delta P_i(\overline{S})=\overline{S}-P_i$ with $P_i$ a known matrix $M(\overline{S},\overline{\theta})=-\Delta P_i(S)A_i-A_i^T\Delta P_i(\overline{S})-\Delta A_i(\overline{\theta})^TP_i-P_i\Delta A_i(\overline{\theta})$ with $A_i=A\theta_i(S)$, $\overline{\theta}$ are decision variables, and $I_n$ is an n-dimensional identity matrix.

14. A method for controlling a performance of a motion-control system for moving a mass according to different tasks, comprising:
   a processor in communication with a memory, the processor configured to:
   selecting from a set of tunable parameters and a set of control actions in response to receiving a specific task of the performance, a value of a tunable parameter and a specific control action, wherein the selecting comprises:
      optimizing a cost function representing the performance of the specific task, wherein the cost function optimizes operation of the motion control system by evaluating pairs of tunable parameters and a control policy; and
      selecting the value of the tunable parameter and the specific control action according to the cost function, wherein the selecting includes optimizing the cost function by selecting an optimal pair of the value of the tunable parameter and the specific control action based on transforming non-convex constraints into convex constraints in an optimization module;
   adjusting, before the performance, a mechanical response of a tunable actuator according to the value of the tunable parameter, wherein the tunable actuator is mechanically arranged in the system, such that different values of the tunable parameter change dynamics of the system;
   controlling, during the performance, a controllable actuator to perform the specific task using the specific control action, such that optimizing the performance of the specific task optimizes the performance of the controllable actuator controlling the movement of the mass.

15. The method of claim 14, wherein the tunable parameter is constant during the performance of the specific task and a parameter of the controllable actuator varies during the performance of the specific task.

16. The method of claim 14, further comprising:
   simulating the performance of the specific task to evaluate the cost function for each pair i in a set of N pairs ($\theta_i$, $u_i$) of values of the tunable parameter $\Theta$ and the specific control action $u_i$; selecting the pair corresponding to a minimal value of the cost function.

17. The method of claim 14, wherein the selecting solves the optimization module including optimizing the cost function representing at least a joint operation of the controllable actuator and the tunable actuator, comprising:
   parameterizing an optimal control policy as a linear function of a system state;

reformulating the optimization module as a second optimization module having tunable parameters, control parameters and a cost matrix parameterizing a cost of performance as decision variables subject to non-convex constraints;

partitioning the second optimization module into an optimal control design module optimizing a control of the controllable actuator with a fixed value of the tunable parameter of the tunable actuator and an optimal mechanical design module optimizing a value of the tunable parameter of the tunable actuator and the cost matrix subject to the non-convex constraint; and solving the optimal control design module and the optimal mechanical design module iteratively to produce the value of the tunable parameter and the specific control action.

18. A tunable motion-control system for moving a mass according to different tasks, comprising:

a processor;

a memory coupled to the processor and storing program instructions executable by the processor:

a controller in communication the processor and at least one controllable actuator, wherein the at least one controllable actuator performs the different tasks;

an input module in communication with the controller, for receiving a specific task to perform, such that a performance of the specific task is controlled by the controller;

a tunable actuator having a tunable parameter of mechanical response, wherein the tunable actuator is mechanically arranged in the system, such that different values of the tunable parameter change dynamics of the system; and an optimization module for jointly selecting a value of the tunable parameter and a specific control action based on optimizing the performance of the specific task, such that optimizing the performance of the specific task optimizes the performance of the controllable actuator controlling the movement of the mass, wherein the optimization module determines the tunable parameter by optimizing a cost function representing at least a joint operation of the controllable actuator and the tunable actuator, wherein the solving includes:

parameterizing an optimal control policy as a linear function of the system state;

reformulating the optimization module as a second optimization module having tunable parameters, control parameters and a cost matrix parameterizing a cost as decision variables subject to non-convex constraints;

partitioning the second optimization module into an optimal control design module optimizing a control of the controllable actuator with a fixed value of the tunable parameter of the tunable actuator and an optimal mechanical design module optimizing a value of the tunable parameter of the tunable actuator and the cost matrix subject to the non-convex constraint;

transforming the optimal mechanical design module into a relaxed optimal mechanical design module subject to convex constraints; and solving the optimal control design module and the optimal mechanical design module iteratively to produce the value of the tunable parameter and the specific control action.

19. The system of claim 1, wherein specific task includes an initial position and a velocity of a load mass, a final position and a velocity of the load mass, an acceleration constraint and a velocity constraint on the load mass, a time constraint for accomplishing the specific task, and a criterion to evaluate an operation of a tunable motion control system.

* * * * *